(12) United States Patent
De Oliveira et al.

(10) Patent No.: US 7,552,213 B2
(45) Date of Patent: Jun. 23, 2009

(54) REMOTE NETWORK NODE MANAGEMENT SYSTEM AND METHOD

(75) Inventors: Henrique Gobbi De Oliveira, Fremont, CA (US); Graham Holt, Pleasanton, CA (US); Ivan Passos, Fremont, CA (US); David Ian White, Livermore, CA (US)

(73) Assignee: Avocent Fremont Corp., Fremont, CA (US)

( * ) Notice: Subject to any disclaimer, the term of this patent is extended or adjusted under 35 U.S.C. 154(b) by 573 days.

(21) Appl. No.: 11/127,850

(22) Filed: May 12, 2005

(65) Prior Publication Data
US 2006/0259612 A1      Nov. 16, 2006

(51) Int. Cl.
*G06F 13/00* (2006.01)
(52) U.S. Cl. ....................................................... 709/224
(58) Field of Classification Search .................. 709/224
See application file for complete search history.

(56) References Cited

U.S. PATENT DOCUMENTS

2003/0233583 A1* 12/2003 Carley ......................... 713/201
2005/0086494 A1* 4/2005 Carley ......................... 713/182

OTHER PUBLICATIONS

International Search Report and Written Opinion from corresponding PCT Application No. PCT/US06/18464 mailed Jul. 8, 2008.

* cited by examiner

*Primary Examiner*—Robert B Harrell
(74) *Attorney, Agent, or Firm*—Davidson Berquist Jackson & Gowdey LLP

(57) ABSTRACT

A system for transparent switching of management sessions utilizing in-band and out-of-band technologies is provided. The system provides continuous access to the managed system(s) by combining in-band tools, which generally require lower network bandwidth and provide better response time with less latency when the system under management is in-service, with out-of-band tools that provide continued access to the system under management when the network interface or operating system become unstable or the system in placed by an operator or falls unexpectedly to an out-of-service condition.

18 Claims, 7 Drawing Sheets

REMOTE NETWORK NODE MANAGEMENT SYSTEM AND METHOD

FIELD OF THE INVENTION

This invention relates to the field of computer network management and specifically to methods for accessing and managing computer, networking, and telecommunication systems equipment that may utilize both In-Band and Out-of-Band techniques and protocols for remote management access.

BACKGROUND OF THE INVENTION

Information Technology professionals commonly use tools to remotely access and control network nodes such as computer servers. These typical remote access tools permit the IT professional to manage and restore the operations of the network nodes remotely. Typically, these remote access tools are divided in two categories: In-band Tools and Out-of-band Tools. An In-band Tool communicates with the Managed Device relying on the same network interface utilized by the Managed Device for connection to the data network. An Out-of-band management tool communicates with the Managed Device using a separate access media (such as a serial console port or the keyboard-video-mouse interface) that is used exclusively for management. Out-of-band Tools permit the supervisor to access the Managed Device even when the Managed Device loses network connectivity.

In In-band solutions, the Managed Device and the Remote Access Client communicate using well known network protocols, such as Remote Desktop Protocol (RDP), Secure Shell (SSH) and Virtual Network Computing (VNC). In-band Tools allow network administrator to view and interact with the Managed Device using a simple program (the "Viewer" or Remote Access Client) on another computer anywhere on the network (Intranet, Internet and/or Extranet). The two computers need not be of the same type, so for example one can use and In-band Tool to view a Linux server on your Windows PC at home. FIG. 1 shows how In-Band Tools work.

In-band solution comprises three different components. The Remote Access Service which resides in the Managed Device; the Remote Access Client, which resides in the Client Node; and the Network, which is used as a communication path between the Server and the Client applications. Due to this architecture, any In-band Tool requires the proper functioning of all three components to work. If the Managed Device is not functioning properly the Remote Access Service software will not be able to work properly and thus the Client Software will not be able to access the Managed Device. Likewise, if there is a problem in the Network, the Remote Access Client will not be able to reach the Remote Access Service making the solution unusable. For these reasons In-band Tools are normally used for routine maintenance where there is little or no risk of an error occurring in any of the three components.

In-Band tools are included in all major Operating Systems. People are used to having these tools ready at no additional cost. Other important characteristics are performance and efficiency. Since In-Band Tools include a component that is embedded inside the Managed Device then the Server-Client communication can be optimized and closely coupled to the normal local user interface which minimized latency and bandwidth requirements. Many solutions (both open source and commercial) are offered today that allow In-band remote access such as Citrix Metaframe, Tarantella, PC Anywhere, OpenSSH, SecureCRT.

In-band Tools, however, become ineffective whenever the Network path associated with the Managed Device fails or the Managed Device loses network connectivity. To overcome this limitation, tools were created that enable the remote access to the out-of-band management ports of the Managed Device. These Out-of-band Tools use interfaces such as serial console and KVM ports to generate management data. FIG. 2 shows how out-of-band tools work.

In-Band Tools such as RDP or SSH are normally used for day to day maintenance of managed devices since they allow for almost instant secure remote access to systems and allow the operator to perform any duties as if they were at the system locally. They are normally network optimized and provide a combination of low bandwidth utilization (compared to Out-of-Band protocols such as KVM/IP) and very good performance with very little latency. The Remote Access Client software required to utilize these protocols are low cost and, in many cases, are included with the Client Node Operating System, which leads to a low cost of usage. The major disadvantage of In-Band Tools is that they require the Managed Device and the Network to be in a stable condition and so cannot be used in situations where the connection to the Managed Device has been lost.

In contrast, Out-of-Band Tools are normally used for emergency access to systems that are not available through In-Band Tools or for high risk management tasks that may cause some interruption to the In-Band Flow, such as changing an IP address, routing a table configuration, or executing operations that require a system restart. An Out-of-Band solution comprises three components: (1) Out-of-band Device, which interfaces with the out-of-band interface of the Managed Device and converts the data to a format suitable for transmission over the network; (2) the Remote Access Client, which resides in the Client node and communicates with the Out-of-Band Device; (3) and the Out-of-Band Network, which is used as a communication path between the Out-of-band Device and the Remote Access Client. Note that, in some cases, the Out-of-Band device can reside inside the Managed Device such as a service processor embedded onto a motherboard, but it is still a different entity altogether and its function does not rely on the Managed Device. Out-of-Band Devices in use today include Console Servers, like the Cyclades AlterPath ACS and the Lantronix SecureLinx; KVM over IP switches, like the Cyclades AlterPath KVM/net and the Avocent DS Series; and BMC (Baseboard Management Controller), like HP iLO and IPMI.

Out-of-band solutions are more expensive than In-band solutions. Out-of-band tools usually require more network bandwidth and often do not perform well over high-latency, low-bandwidth networks. There is also a limitation on the number of simultaneous connections. Out-of-band Devices usually have a limitation on the number of simultaneous management sessions they can provide and, increasing this number is expensive.

Out-of-Band Tools access the Managed Device using a dedicated management connection and so even when the system is unstable the Out-of-Band connection is normally still available. Since Out-of-Band Tools are required to convert signals from one form to a form suitable for secure transmission over TCP/IP, the network bandwidth requirement may be higher than when using In-Band Tools, performance of the Remote Access Client is lower, latency is introduced and the cost of deployment of the necessary infrastructure may be higher than for In-Band Tools.

Covering all remote access requirements in the most effective and efficient way requires a combined approach using both In-Band and Out-of-Band Tools. Some companies have provided solutions that allow this such as the SSL-UAG+ product from Xceedium. This approach however exhibits several key limitations as follows:

- The user must have access to multiple Remote Access Clients (Viewers) in order to use each of the different In-Band and Out-of-Band Tools.
- The user must be trained to use different Remote Access Clients and trained to make choices as to which method of access to use. This leads to both increased cost of deployment and ownership and also to increased operator error.
- The user must decide which Tool (In-band or Out-of-Band) to utilize at any given time. This can lead to a loss of personnel productivity due to connections being unavailable or to Out-of-Band connections being unnecessarily blocked by another user.
- Network bandwidth may be used inefficiently by operators choosing an Out-of-band Tool when an In-band Tool is available.
- An operator will unexpectedly lose connectivity to a managed asset and will be required to restart the connection using an alternative protocol. This will be confusing and will lead to higher occurrences of operator error.

Thus, it is desirable to provide a smart switch module that combines in-band access and tools with out-of-band access and tools while overcoming the limitations of the conventional solutions that combine both in-band and out-of-band tools, and it is to this end that the present invention is directed.

SUMMARY OF THE INVENTION

A smart switch module in accordance with the invention comprises a system and method for intelligently and automatically switching between network management data flows to provide continuous remote access to one or more managed system(s) reducing the complexity of remote management solutions, optimizing network bandwidth, providing optimum access and response times, and maximizing availability of management resources. The system provides continuous access to the one or more managed system(s) by combining in-band tools, which generally require lower network bandwidth and provide better response time with less latency when the system under management is in-service, with out-of-band tools that provide continued access to the system under management when the network interface or operating system become unstable or the system in placed by an operator or falls unexpectedly to an Out-of-Service condition.

The invention is a system that includes a plurality of different remote management access protocols including but not limited to Remote Desktop Protocol (RDP), Virtual Network Computing (VNC), X Windows (X11), Digital Keyboard Video Mouse (KVM/IP), Secure Shell (SSH), Telnet, Serial Console, Serial over LAN (SOL), IPMI, and other remote management access protocols yet to be developed that are within the scope of the invention.

The invention includes monitoring services to ascertain the availability of each protocol that may be used for any system under management and a decision engine that evaluates the suitability of each protocol for the current session based on the condition of the network, the system under management and the administrator's current connection options settings. The invention continues to monitor the protocol during any session and will switch to an alternative session protocol (using the decision engine) if the current session protocol becomes unavailable or if a more efficient session protocol becomes available.

By using this invention, several advantages over conventional systems exist. For example, the network bandwidth is optimized by selecting more efficient protocols such as In-Band when they are available and switching to the less optimal protocols such as Out-of-Band only when dictated by the condition of the system under management. In addition, the response time and latency in the management interface is minimized by selecting the most optimal protocols such as In-Band when they are available and switching to less optimal protocols such as Out-of-Band only when dictated by the condition of the system under management. The system also maximizes the continuity of the connection by switching between connection methods and protocols dictated by the availability of each protocol. User contention is minimized by making more efficient use of the available network bandwidth and using less intensive protocols when they are available. In addition, the management Infrastructure cost is minimized by optimizing the use of expensive Out-of-Band technologies and operator training and operator error is minimized by providing seamless switching between protocols since the operator does not need to know which protocol or which software application he needs to use to access a system.

The Smart Switch module in accordance with the invention may be implemented in several different manners, all of which are within the scope of the invention. For example, the smart switch module may be implemented as a software module or application that may be installed directly to an administrator's workstation or as a software module or application that can be used as a plug in to a larger centralized management system such as HP OpenView, IBM Tivoli, IBM Director, Microsoft System Management Server. The smart switch module may also be implemented as a software module integrated into an appliance that includes Out-of-Band physical access media such as, for example, a software module integrated with a KVM/IP switch. Alternatively, the smart switch module may be implemented as a software module integrated with an access management gateway appliance such as Cyclades AlterPath Manager, Xceedium SSL-UAG+, Avocent DSView, Raritan Command Center. The smart switch also may be implemented using an application specific integrated circuit (ASIC).

DETAILED DESCRIPTION OF A PREFERRED EMBODIMENT

The invention is particularly applicable to a remote management solution for Microsoft Windows servers that utilize a remote KVM/IP system for Out-of-Band access and use Remote Desktop Protocol RDP for In-Band access and it is in this context that the invention will be described. It will be appreciated, however, that the system and method in accordance with the invention has greater utility since 1) the system may be used with any existing interfaces and protocols as well as any newly developed interfaces and protocols; and 2) the system may be implemented in various manners that are within the scope of the invention.

Figure 1:
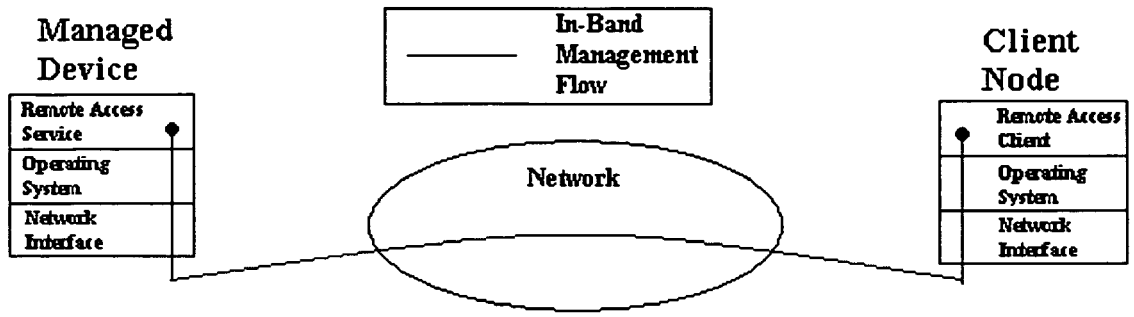
FIG. 1 illustrates the use of In-Band Tools.
Figure 2:
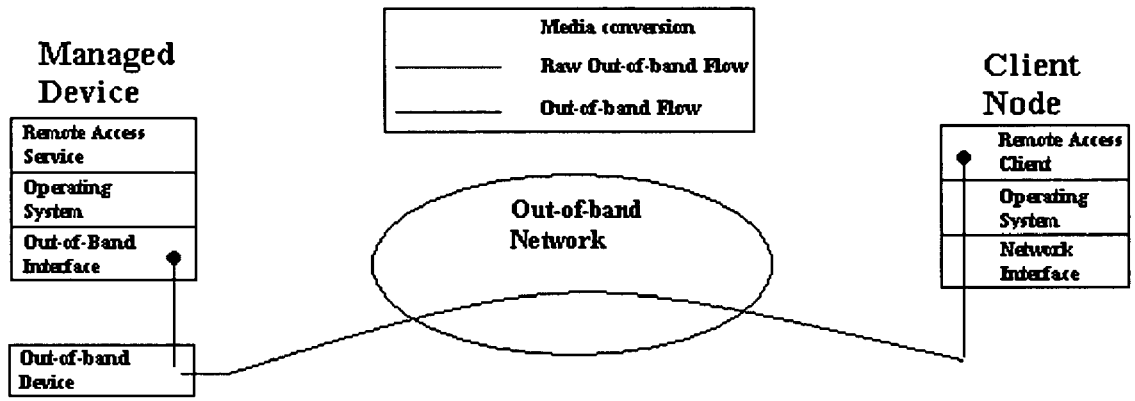
FIG. 2 illustrates the use of Out-of-Band tools.
Figure 3:
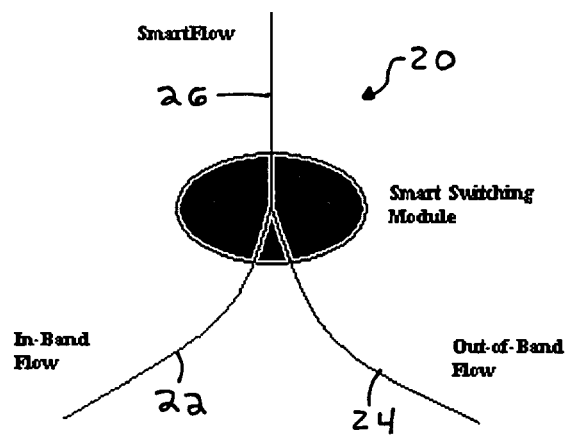
FIG. 3 illustrates a smart switch module in accordance with the invention in which two management flows from the module to the managed device are illustrated.

FIG. 3 illustrates a smart switch system 20 in accordance with the invention. The smart switch module receives a first management data flow 22 and a second management data flow 24 from the system 20 to a managed device (now shown). In this example, one flow 22 is using In-Band access to the system under management and the other flow 24 is using Out-of-Band access to the same system (via an Out-of-Band device not shown). In accordance with the invention, the system 20 selects between the flows and delivers a smart flow 26 to the user application independently from the flow being used to communicate with the system under management at any time. Thus, the module provides continuous access to the one or more managed system(s) by combining in-band tools, which generally require lower network bandwidth and provide better response time with less latency when the system under management is in-service, with out-of-band tools that provide continued access to the system under management when the network interface or operating system become unstable or the system in placed by an operator or falls unexpectedly to an Out-of-Service condition. To better understand the smart switch module in accordance with the invention, a typical out-of-band system and an in-band system are now described.

Figure 4:
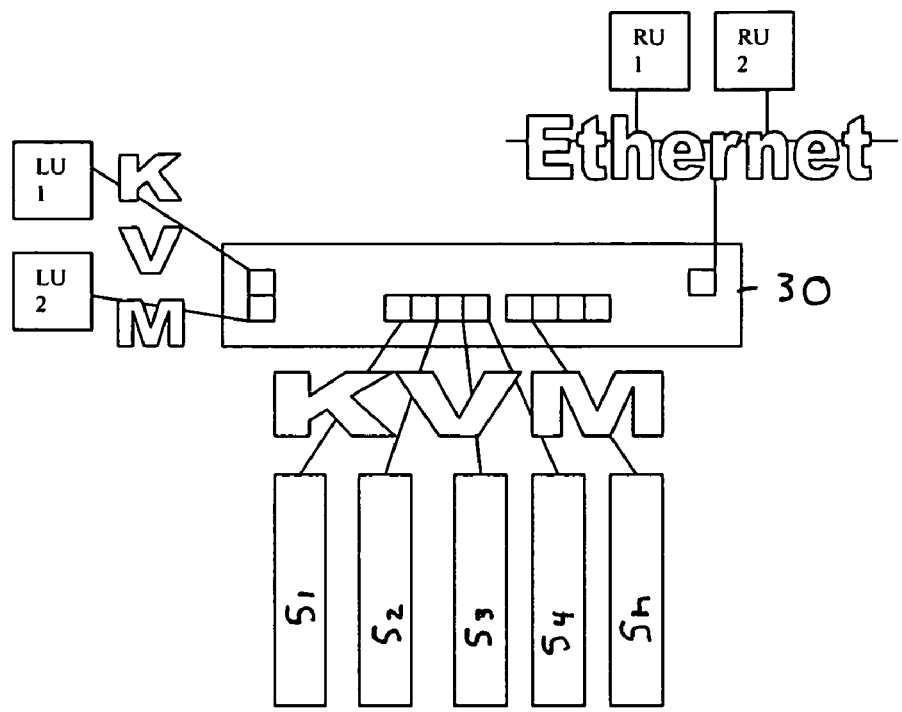
FIG. 4 illustrates a conventional Out-of-Band access solution using KVM/IP.

FIG. 4 is a diagram illustrating a conventional Out-of-Band system for Microsoft Windows systems that utilizes KVM/IP technology and a KVM/IP switch 30. In the diagram, each managed device/system (server S1-Sn in this example) has a physical connection between its Keyboard, Video, and mouse connectors and the KVM/IP appliance that acts as a multiplexer to provide access to any of the servers in a well known manner. One or more local users, such as local users LU1 and LU2, are physically connected to the KVM/IP switch 30 using dedicated Keyboard-Video-Mouse connections and may access each of the servers individually by navigating through a menu system that is embedded in the KVM/IP switch 30. One or more remote users, such as remote users RU1 and RU2, may establish connections to the KVM/IP switch 30 using a typical web browser over an Ethernet connection or the Internet and navigate through a menu system in the KVM/IP switch to select a server to which the remote user would like to connect. At this point, a KVM/IP viewer application (not shown, but well known) is launched in the remote user workstation (physically located at the location of the remote user) that establishes a connection to the KVM/IP switch and through to the server. A limitation of this conventional out-of-band system is that only a limited number of users may access the systems so that simultaneous access to all systems is not possible in a cost effective manner. This conventional solution is further limited in that the network bandwidth required for the KVM/IP protocol is relatively high and the nature of KVM/IP means that the operator experiences latency and lack of synchronization with for example the mouse pointer which leads to inefficient use of the systems.

Figure 5:
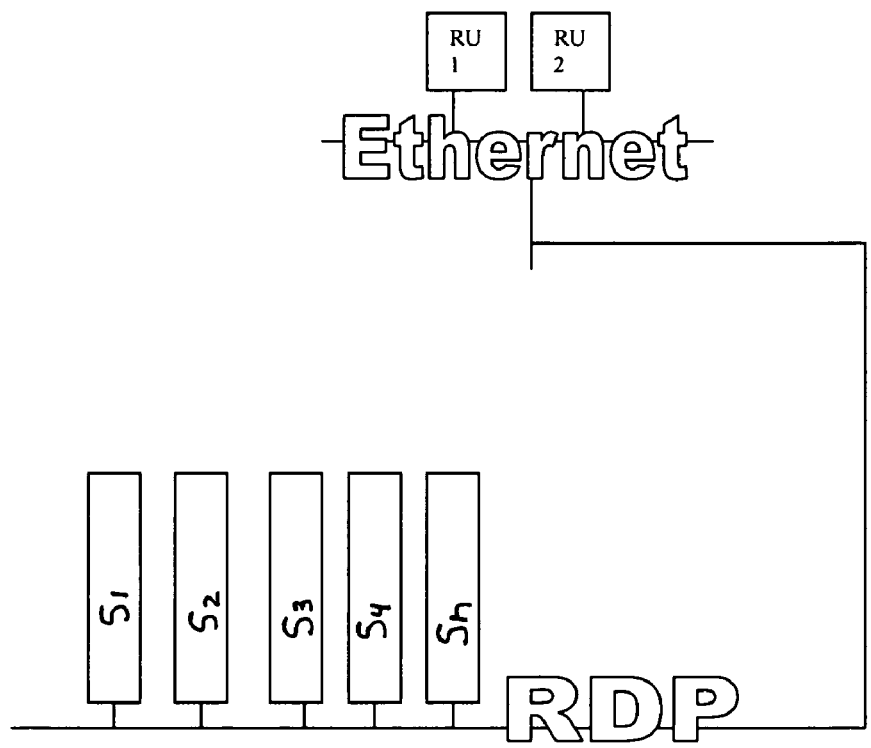
FIG. 5 illustrates a conventional In-Band access solution using RDP.

FIG. 5 is a diagram representing a conventional In-Band system for Microsoft Windows systems that utilizes the well known Remote Desktop Protocol (RDP) to provide remote access to the operator. In this diagram, one or more managed devices/systems, such as one or more servers S1-Sn, is connected to a production or management network using Ethernet or remotely using a dial up connection with PPP. One or more remote users, such as remote user RU1 and RU2, are also connected to the network and may access the servers using an embedded RDP client viewer over a TCP/IP connection. This in-band system has benefits over KVM/IP (FIG. 4) in that the protocol is more efficient for transmission over the network which leads to lower bandwidth utilization and better response time. The close coupling of the protocol to the operating system's own video subsystem also means that complete synchronization is possible which leads to a more efficient user experience. The limitation of this in-band system, however, is that is it only available when the operating system/network are running and so cannot provide any coverage for Out-of-Band or Out-of-Service conditions.

In order to provide an effective management access solution a combination of the two approaches (In-Band and Out-of-Band) must be used. Without the use of the invention as described below, a combination of the two approaches (In-Band and Out-of-Band) leads to management difficulties and human error since the administrator must deal with two different remote access systems, and must make decisions on which system to use at any given time. The smart switch module in accordance with the invention overcomes this problem to provide a combination of in-band and out-of-band remote access while reducing management difficulties.

Figure 6:
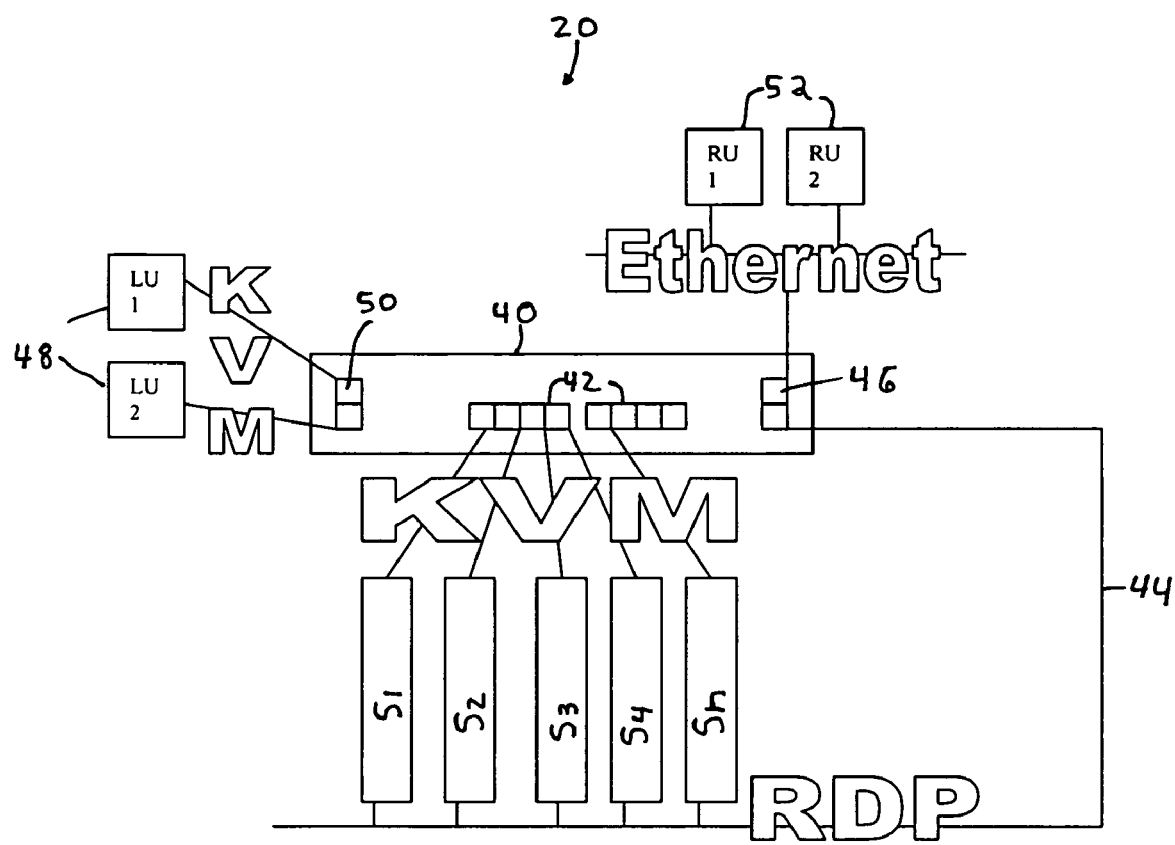
FIG. 6 illustrates an embodiment of the smart switch module in accordance with the invention.

FIG. 6 is a diagram representing an embodiment of the smart switch system 20 and in particular, a smart switch module 40 in accordance with the invention. In accordance with the invention, the out-of-band access (KVM in the example shown here) and in-band access (RDP in the example shown here) are combined in one solution and the invention is used to provide a single client viewer that can monitor the In-Band and Out-of-Band connection status and dynamically switch between the two access modalities to provide the most effective and efficient access to the systems under management. In this embodiment, one or more managed devices/systems, such as servers S1-Sn in this example, may be connected directly to the smart switch module 40 using well known dedicated Keyboard, Video and Mouse (KVM) connections 42. The systems under management may also connected to a production and/or management network 44 which may transport well known Remote Desktop Protocol (RDP) traffic through a connection 46, such as Ethernet or dial up connection using PPP, to the smart switch module 40. Typical systems being managed using KVM and RDP are Microsoft Windows 2000 which includes a Keyboard Video and Mouse interface in the hardware and includes two instances of RDP protocol service. Typical KVM access devices also known as KVM/IP switches are produced by Cyclades Corporation in the AlterPath KVMnet, and Avocent in the DSR series switches. RDP client applications are implemented as standard in Windows XP and other Windows platforms ass well as being available for Linux and Unix in the Remote Desktop project. One or more local users 48, such as local users LU1 and LU2 in this example, may be connected to the smart switch module 40 using dedicated Keyboards, Video, Mouse cables 50 and one or more remote users 52, such as remote users RU1 and RU2 in this example, may be connected over the connection 46 using a typical web browser. In accordance with the invention, each local or remote user is accessing the system using a typical computer system with sufficient computing power and memory to perform the interactions with the smart switch module. The users' computer systems may include, for example, personal computers, workstations, terminals, PDAs, wireless devices, cellular phones, etc. Each user's computer system may be known as a management station.

A user (whether remote or local) may then log into the smart switch module 40 to be presented with a menu indicating the systems that the particular user is allowed to access. In accordance with the invention, multiple users are able to simultaneously access the managed devices. The user may then select the system that he/she wishes to connect to and then the smart switch module 40 will launch a viewer application (on the user's computer) to allow the user to access the graphical interface of the system under management. The user viewer application will not connect directly to the system under management but instead will connect to an instance of the smart switch module which is residing inside the smart switch module 40. The smart switch module 40 will continuously and automatically (without user actions) monitor the In-Band and Out-of-Band service availability of the system under management and in combination with user and system wide preferences will decide which path to take in connecting to the system under management.

In an exemplary scenario, the system preferences may indicate that RDP should be used in preference to KVM/IP whenever it is available. This preference will provide the users with simultaneous access to all systems under management with the lowest bandwidth utilization. This preference also provides the best user experience in terms of response time and synchronization. In this scenario the smart switch module is configured to utilize KVM/IP when the RDP service is not available. In this scenario, a remote user may establish a connection to the smart switch module and select a managed device/system to which the user would like to connect. The smart switch module then launches a viewer application in the user computer system that connects back to the smart switch module. The smart switch module may then examine the properties configuration (described above) and, seeing that RDP is the preferred connection method, probes the managed device (a particular server) to establish the existence of an available RDP service for the particular managed device. If the service is available, the connection is established using RDP. If the service is not available, a KVM/IP session may be established since the preferences also allow KVM/IP to be used when the RDP service is not available. Even if the RDP protocol is available and used for the connection, the smart switch module will continue to monitor the service and in the case of any interruption will switch automatically and transparently to a KVM/IP session. Due to the nature of the Microsoft Windows operating system the user may be required to login to the system under management again but this behavior will vary based on the attributes and capabilities of the system under management.

Figure 7:
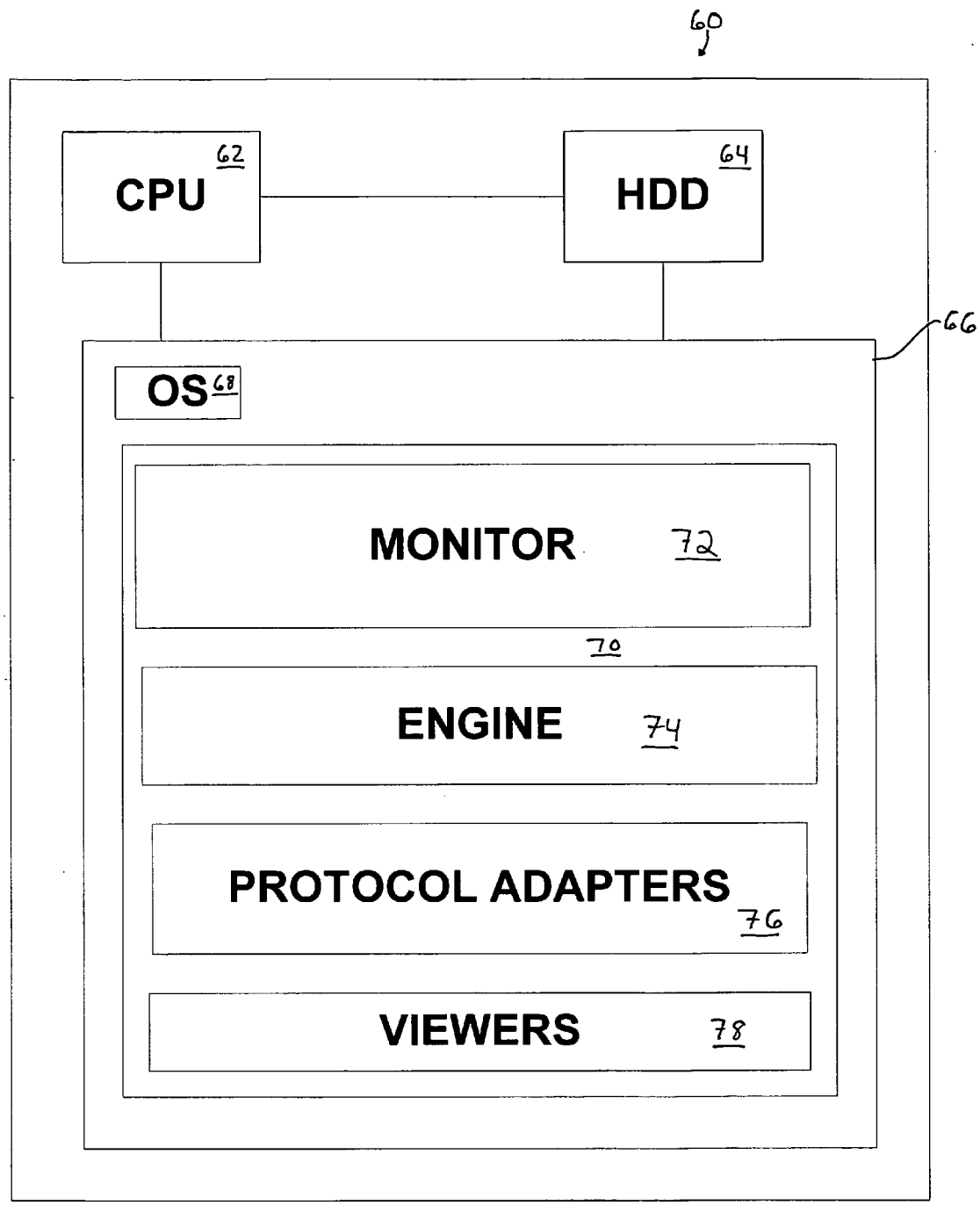
FIG. 7 is a block diagram of the smart switch module in accordance with the invention.

FIG. 7 is a block diagram illustrating a computer system 60 software implementation of the smart switch module in accordance with the invention. In this implementation, the smart switch module is implemented as a software module/application being executed by an appliance. The smart switch module may also be installed directly to an administrator's workstation or it can be used as a plug in to a larger centralized management system such as HP OpenView, IBM Tivoli, IBM Director, Microsoft System Management Server. The smart switch module also may be integrated into an appliance that includes Out-of-Band physical access media, such as the software module integrated with a KVM/IP switch. The module also may be a software module integrated with an access management gateway appliance such as Cyclades AlterPath Manager, Xceedium SSL-UAG+, Avocent DSView, Raritan Command Center. The module may also be implemented as an application specific integrated circuit (ASIC). The module may also be implemented in a service processor gateway in accordance with the invention.

The computer system may have various well known components that are not shown in FIG. 7 including a display device and various input/output peripherals. The computer system 60 also has a CPU 62 and a persistent storage device 64, such as a magnetic disk drive, optical disk drive, tape drive, non-volatile memory, etc., and temporary memory 66, such as DRAM or SRAM or flash memory, wherein the CPU, persistent storage device and temporary memory are coupled together. The persistent storage device stores one or more software applications modules while the temporary memory stores one or more software applications/modules while the modules/applications are being executed by the CPU as is well known. In order to implement the smart switch module in accordance with the invention, the one or more software modules may be resident in the temporary memory 66 and may be executed by the CPU 62. In particular, the computer system may execute a typical operating system 68 and a smart switch software application 70. The smart switch software application 70 may include a monitor module 72, an engine module 74, one or more protocol adapters 76 and one or more viewers 78. The monitor module may monitor the network management services to ascertain the availability of each protocol that may be used for any system under management. The engine module 74 evaluates the suitability of each protocol for the current session based on the condition of the network, the system under management and the administrator's current connection options settings and selects the protocol/service. In accordance with the invention, the invention continues to monitor the protocol during any session and will switch to an alternative session protocol (using the decision engine) if the current session protocol becomes unavailable or if a more efficient session protocol becomes available. The protocol adapters 76 permit the smart switch module to interface with and connect to the various different network management protocols. In accordance with the invention, additional protocol adapters may be incorporated into the system at any time so that the system is able to handle any new protocols. The one or more viewers 78 permit the smart switch module to provide viewer applications to each user of the system.

The flow diagrams described below demonstrate the functionality of the smart switch module (SSM) in accordance with the invention. The flow diagrams assume a scenario where two connection protocols are available but it will be appreciated that the invention can be extended to any number of connection protocols.

Figure 8:
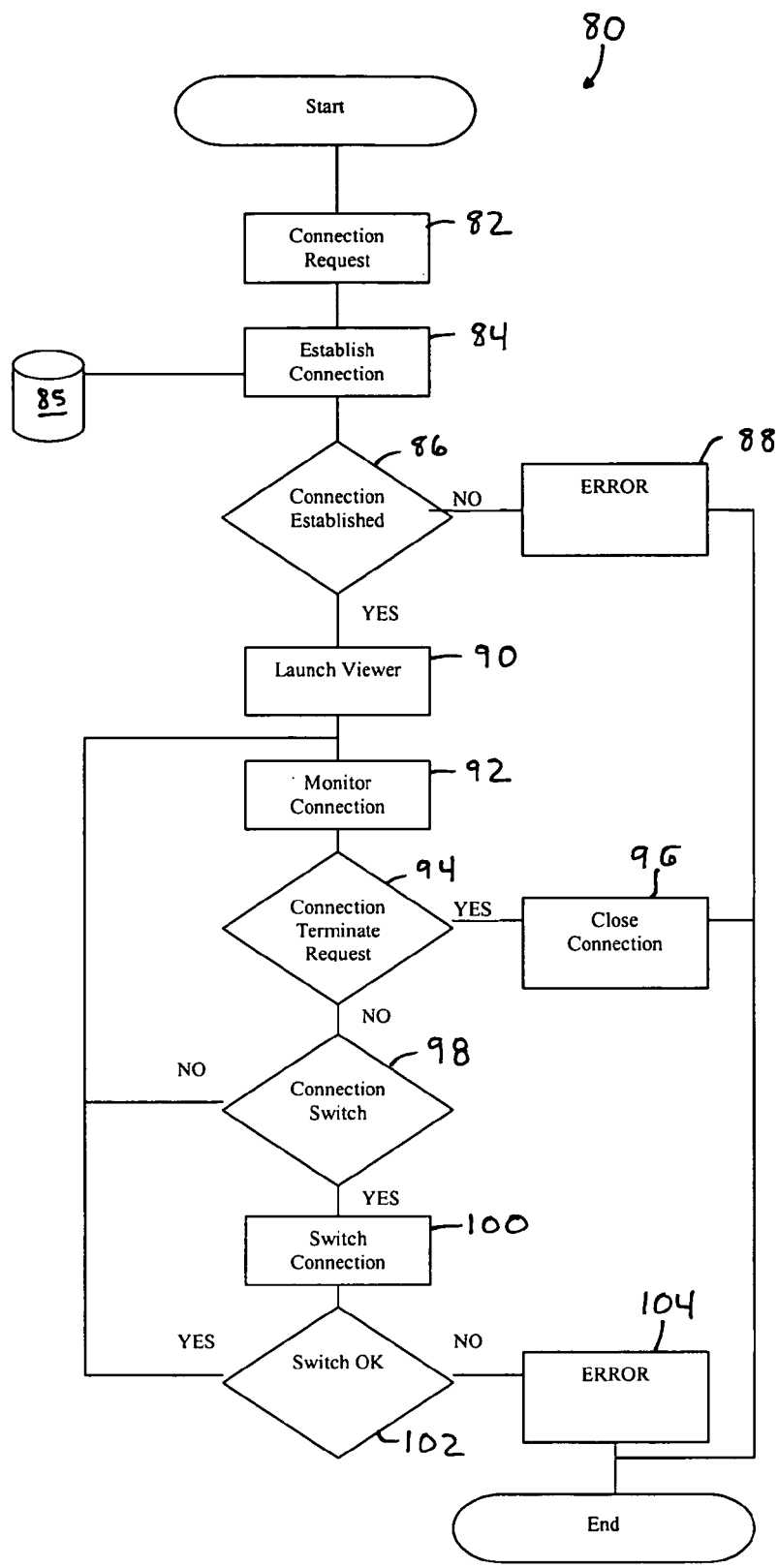
FIG. 8 is a flow diagram of a method for network management in accordance with the invention using the smart switch module.

FIG. 8 is a flow diagram that illustrates a method 80 for smart switching in accordance with the invention. In accordance with the invention, the smart switch module ("SSM") waits for a connection request to start the method. On receiving a connection request (step 82), the SSM runs an establish connection algorithm (step 84) which is described in more detail below with reference to FIG. 8. This algorithm checks system preferences (located in a preference database 85) and service availability to decide which connection methods and protocols to use (e.g., an in-band protocol or an out-of-band protocol). If a connection cannot be established (step 86) then an error is returned to the user (step 88) and the method is completed. If a connection is established then the SSM will return and launch a viewer application (step 90) and begin to monitor the connection (step 92) which is described in more detail with reference to FIG. 10. If the connection is terminated by the user (step 94) (based on a connection termination request) then the connection is closed (step 96) and the method is completed. If a connection switch request is received (step 98) from the monitor connection module (See FIG. 7) then a connection switch is attempted (step 100). Once the secondary session is established, the SSM returns to the monitoring loop in step 92. If the switch of connection cannot be completed (step 102) then in the case where the secondary connection was chosen because of failure in the primary an error is returned (step 104) since no connection is available at this point. If the secondary was selected due to preferences but it is not available and the primary connection is still available then no switch will occur and the SSM will return to the monitoring loop in step 92. Now, the method for establishing the connection in accordance with the invention will be described.

Figure 9:
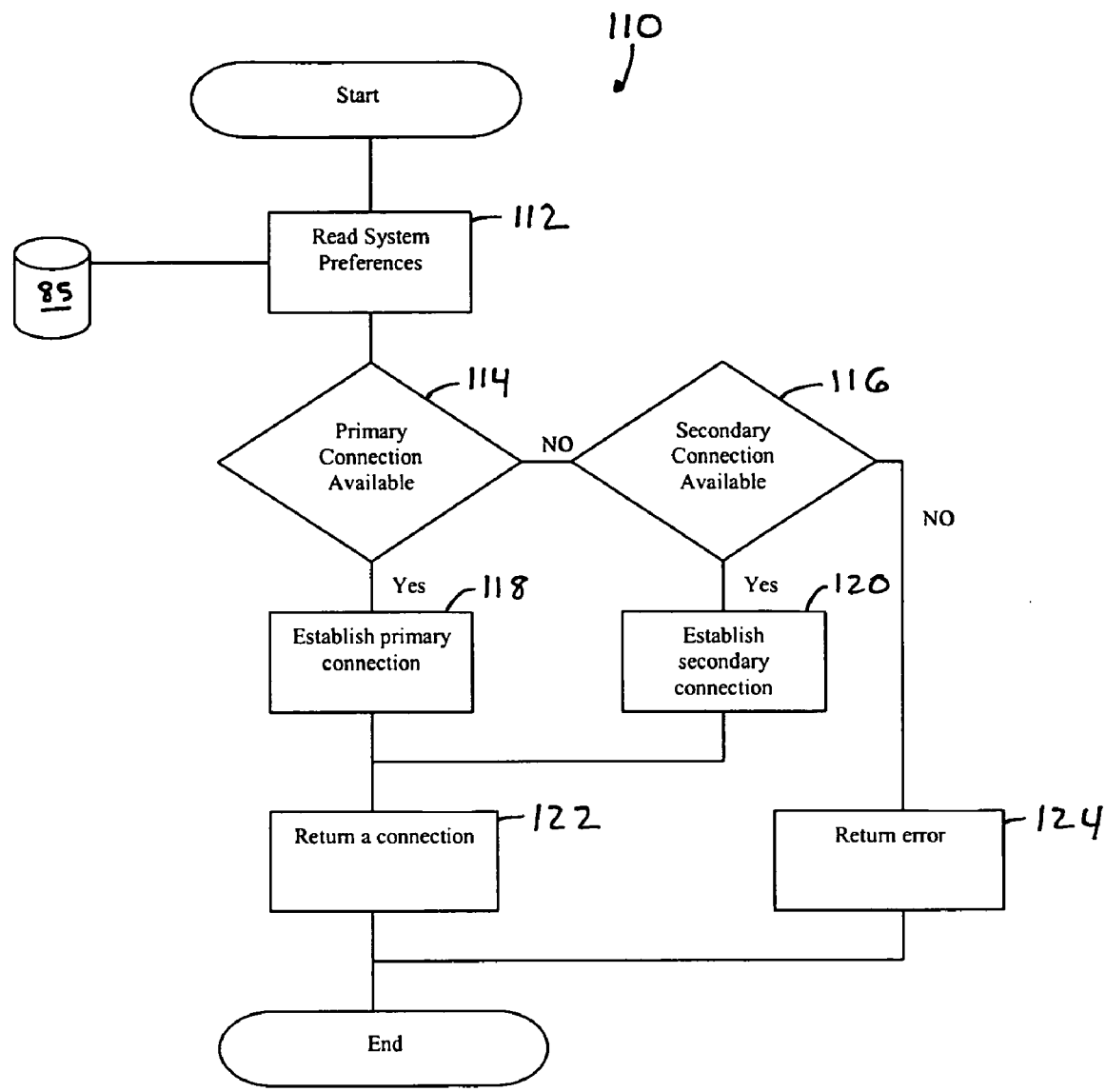
FIG. 9 is a flow diagram showing a method for establishing a connection from the smart switch module.

FIG. 9 is a flow diagram that illustrates a method 110 of the actions taken by the smart switch module during the establish connection phase. Note that the smart switch module in this embodiment is a software module that represents a piece of the functionality of the smart switch appliance. Once a connection is requested, the SSM queries the system preferences (step 112) in the preferences database 85 to determine which connection types may be used for a particular user and which ones are preferred for the particular user in which conditions. If the preferred or primary connection type is available (step 114) then a connection is established using the primary protocol (step 118) and a connection is returned (step 122). A preferred method for checking the availability of a connection uses a well known network service availability probe. If the primary connection is not available, then the secondary connection type is checked for availability (step 116). If this secondary connection is available then the secondary connection is established (step 120) and a connection is returned (step 122). If the secondary is also not available then an error is returned (step 124).

Figure 10:
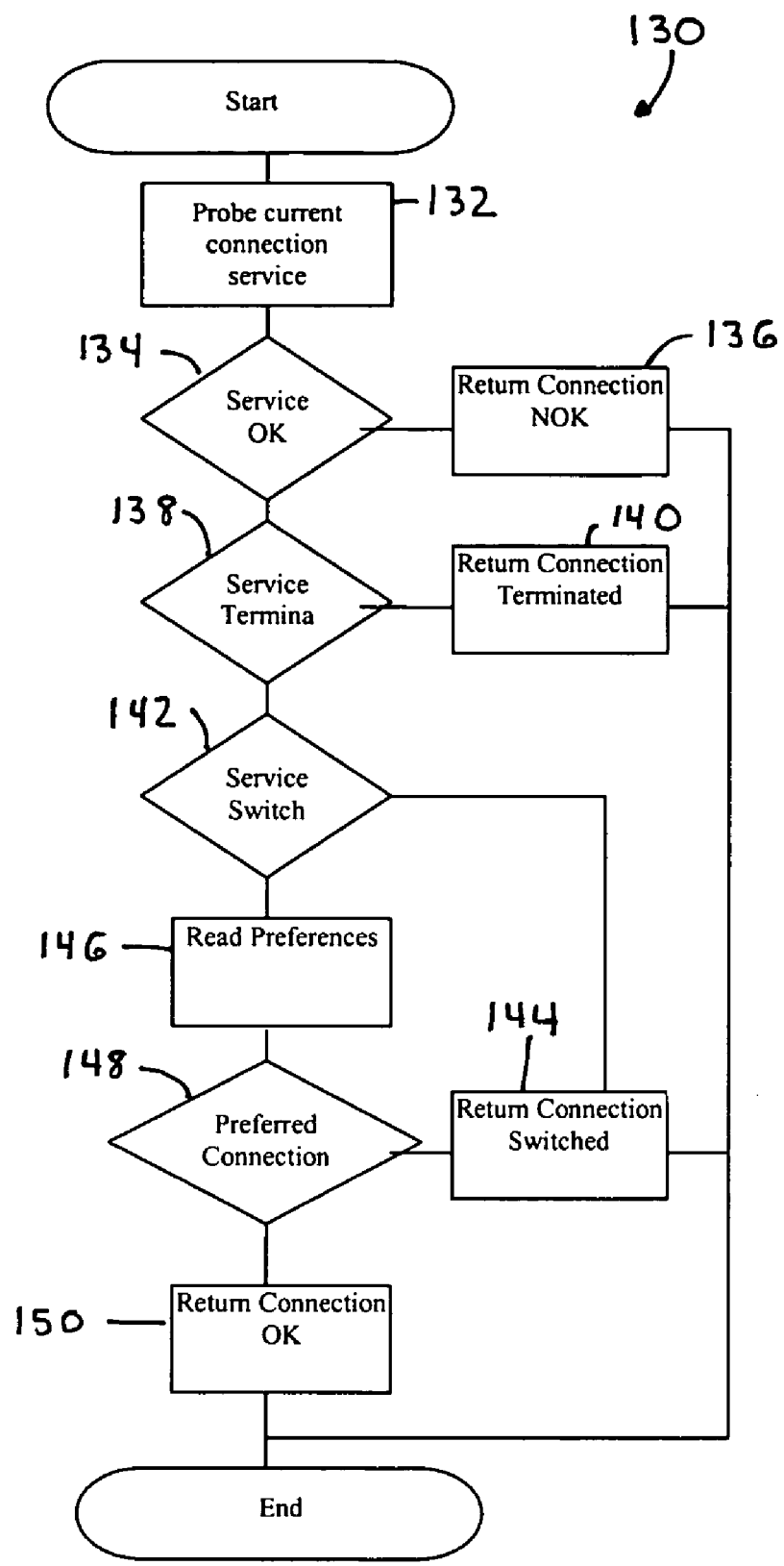
FIG. 10 is a flow diagram showing a method for the monitoring of established connections using the smart switch module in accordance with the invention.

FIG. 10 is a flow diagram that illustrates a method 130 of the action taken by the SSM during the connection monitoring phase. The SSM probes the current connection to determine its status (step 132). Preferably, the status of the connection may be monitored directly by the protocol adapters or may use an external network service availability probe such as big brother to monitor the status of the connection. The status is checked (step 134) and if the connection is no longer available then the module returns a connection status NOT OK (step 136) and terminates the method. If the connection is OK then the module checks to see if a termination request was received from the user viewer (step 138). If the terminate request was received then the module returns a connection terminated (step 140) and terminates. Next the module checks to see if the user viewer requested a connection change (step 142) when the smart switch module is integrated into the user computer. If the user viewer requested a connection change, then a CONNECTION SWITCH is returned (step 144) and the module terminates. Next the preferences are read (step 146) and a check is made to determine if the current connection is the preferred one (step 148). If the current connection is the preferred connection, then the connection OK is returned (step 150) and the module terminates. If the current connection is not the preferred connection, then CONNECTION SWITCH is returned (step 144) and the module terminates.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A remote management system connected to a plurality of network nodes to be managed using the management system, the system comprising:

a management station that executes software to remotely monitor and control a remote network node on a common viewer based on connection option settings made at the management station including a setting for network response time;

a smart switch module appliance, located between the management station and the remote network node, that provides the common viewer at the management station access to the remote network node using a remote access protocol (1) automatically selected by the smart switch module from one of an in-band protocol and an out-of-band protocol based on a set of predetermined criteria including the connection option settings, and continuing to communicate the management information to the common viewer whether the smart switch module selects the in-band protocol or the out-of-band protocol; (2) continuously testing whether the selected remote access protocol optimally meets the connection option settings and, in the smart switch module, automatically changing to the other of the in-band protocol and out-of-band protocol anytime said other of the in-band protocol and out-of band protocol is currently determined to more optimally meet the connection option settings, and thereafter continuing to seamlessly communicate the management information to the same common viewer whether the smart switch module changed to the in-band protocol or the out-of-band protocol; (3) continuously repeating (2) each time another of the in-band protocol and out-of-band protocol is currently determined to more optimally meet the connection option settings; and the management station remotely monitors and controls the remote network node through the smart switch module seamlessly through the single viewer using the remote access protocol without setting the remote access protocol at the management station.

2. The system of claim 1 further comprising a management gateway appliance wherein the smart switch module further comprises a plurality of computer instructions executed at the management gateway appliance.

3. The system of claim 2, wherein the management gateway appliance further comprises a Keyboard-Video-Mouse switch that uses one or more of the following remote access protocols: Remote Desktop Protocol (RDP), Virtual Network Computing (VNC), Independent Computing Architecture (ICA), X-windows (X.11), and Intelligent Platform Management Interface (IPMI).

4. The system of claim 2, wherein the management gateway appliance further comprises a serial console server using one or more of the following remote access protocols: Telnet, Secure Shell (SSH), and Intelligent Platform Management Interface (IPMI).

5. The system of claim 2, where the management gateway appliance comprises a service processor gateway using one or more of the following remote access protocols: Telnet, Secure Shell (SSH), Remote Desktop Protocol (RDP), Virtual Network Computing (VNC), Independent Computing Architecture (ICA), X-windows (X.11).

6. The system of claim 1 further comprising a management gateway appliance wherein the smart switch module further comprises a plurality of instructions embedded into an application specific integrated circuit (ASIC) residing at the management gateway appliance.

7. The system of claim 6, where the management gateway appliance is a Keyboard-Video-Mouse switch using one or more of the following list of remote access protocols: Remote Desktop Protocol (RDP), Virtual Network Computing (VNC), Independent Computing Architecture (ICA), X-windows (X.11), and Intelligent Platform Management Interface (IPMI).

8. The system of claim 6, where the management gateway appliance comprises a serial console server using one or more of the following remote access protocols: Telnet, Secure Shell (SSH), and Intelligent Platform Management Interface (IPMI).

9. The system of claim 6, where the management gateway appliance comprises a service processor gateway using one or more of the following remote access protocols: Telnet, Secure Shell (SSH), Remote Desktop Protocol (RDP), Virtual Network Computing (VNC), Independent Computing Architecture (ICA), X-windows (X.11).

10. The system of claim 1, wherein the set of predetermined criteria further comprises a set of preference data associated with a user.

11. The system of claim 10, wherein the set of predetermined criteria further comprises an availability of an in-band protocol and an availability of a out-of-band protocol.

12. The system of claim 1, wherein the smart switch module further comprises a monitor module that monitors a connection status of the in-band protocol and the out-of-band protocol to determine the availability of each protocol, a decision engine that selects one of the in-band protocol or the out-of-band protocol based on the set of predetermined criteria, a set of protocol adapters that permit the smart switch module to interface with a plurality of remote access protocols, and a set of viewer applications capable of providing a user interface for the monitoring and controlling of the remote network node.

13. The system of claim 1, wherein the smart switch module further comprises computer instructions executed at the management station.

14. A method of remotely managing a plurality of network nodes using a management station that executes software to remotely monitor and control a remote network node and a smart switch module appliance, located between the management station and the remote network node, the method comprising:
opening a common viewer at the management station;
setting connection option settings at the management station including a setting for network response time;
automatically selecting, at the smart module, a remote access protocol from an in-band protocol to access a remote network node and an out-of-band protocol to access the remote network node based on a set of predetermined criteria including the connection option settings;
accessing, using the smart switch module, remote network node using the selected remote access protocol;
at the management station through the common viewer, remotely monitoring and controlling the remote network node through the smart switch module using the selected remote access protocol;
at the smart switch module, continuously testing whether the selected remote access protocol optimally meets the connection option settings;
at the smart switch module, automatically changing the remote access protocol to another remote access protocol other than the selected remote access protocol anytime said another remote access protocol is currently determined to more optimally meet the connection option settings; and
continuing to seamlessly communicate the management information to the same common viewer when the smart switch module changes to said another remote access protocol.

15. The method of claim 14, wherein the set of predetermined criteria further comprises a set of preference data associated with a user.

16. The method of claim 15, wherein the set of predetermined criteria further comprises an availability of an in-band protocol and an availability of a out-of-band protocol.

17. The method of claim 14, wherein automatically selecting the remote access protocol further comprises monitoring the selected remote access protocol and, if the selected remote access protocol cannot be used to continue to control the remote network node, automatically selecting another remote access protocol based on the set of predetermined criteria.

18. The method of claim 14 further comprising providing a viewer application that provides a user interface for remotely monitoring and controlling the remote network node through the smart switch module.

* * * * *